April 19, 1955    J. DAUGHERTY    2,706,432
CHIP CONVEYOR FOR MILLING MACHINE
Filed July 27, 1951    5 Sheets-Sheet 1

INVENTOR
Jesse Daugherty
Carlson, Pitzner, Hubbard & Wolfe
ATTORNEYS

April 19, 1955 J. DAUGHERTY 2,706,432
CHIP CONVEYOR FOR MILLING MACHINE
Filed July 27, 1951 5 Sheets-Sheet 2
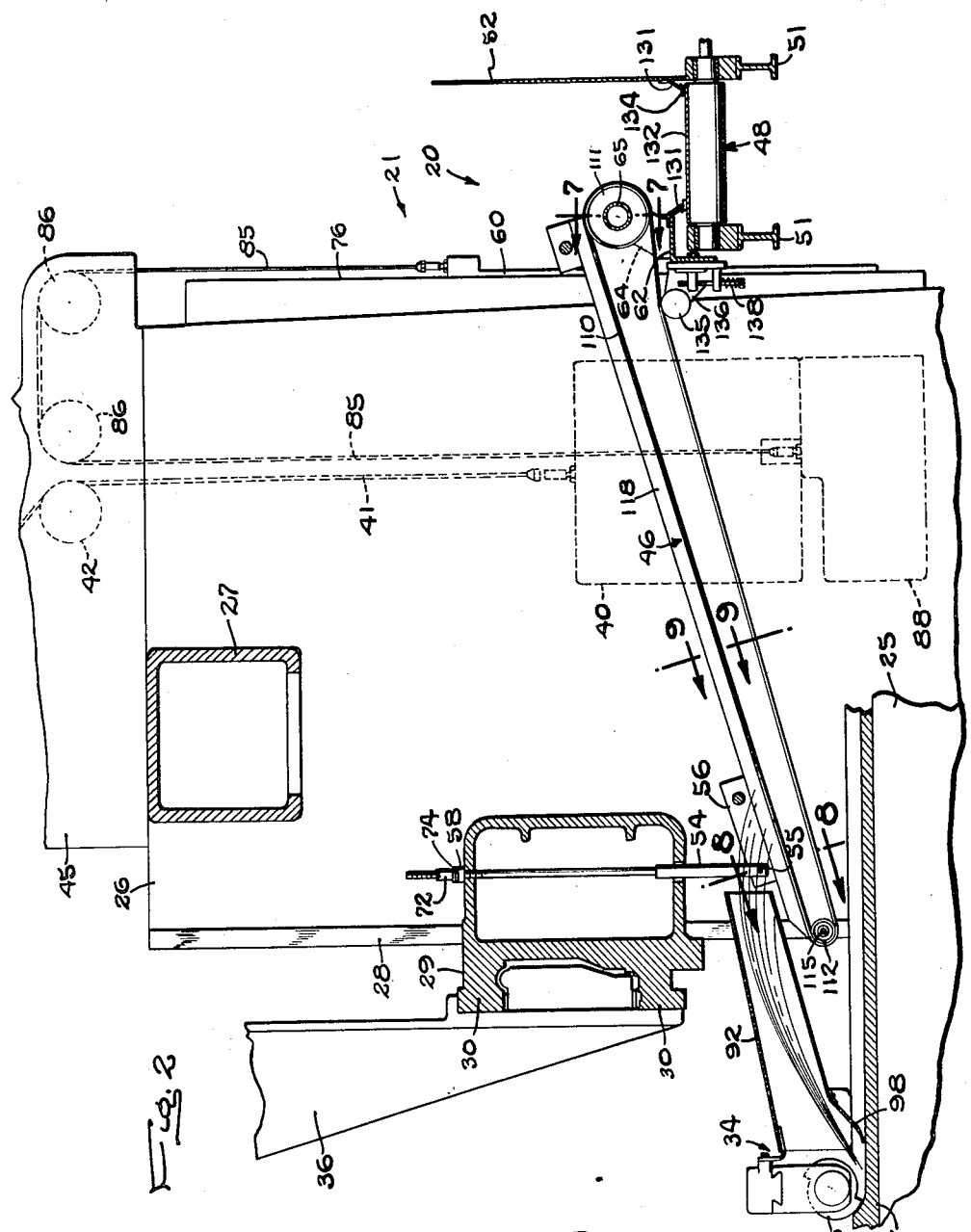
Fig. 2
INVENTOR
Carlson, Pitzner, Hubbard & Wolfe
ATTORNEYS April 19, 1955   J. DAUGHERTY   2,706,432
CHIP CONVEYOR FOR MILLING MACHINE
Filed July 27, 1951   5 Sheets-Sheet 3
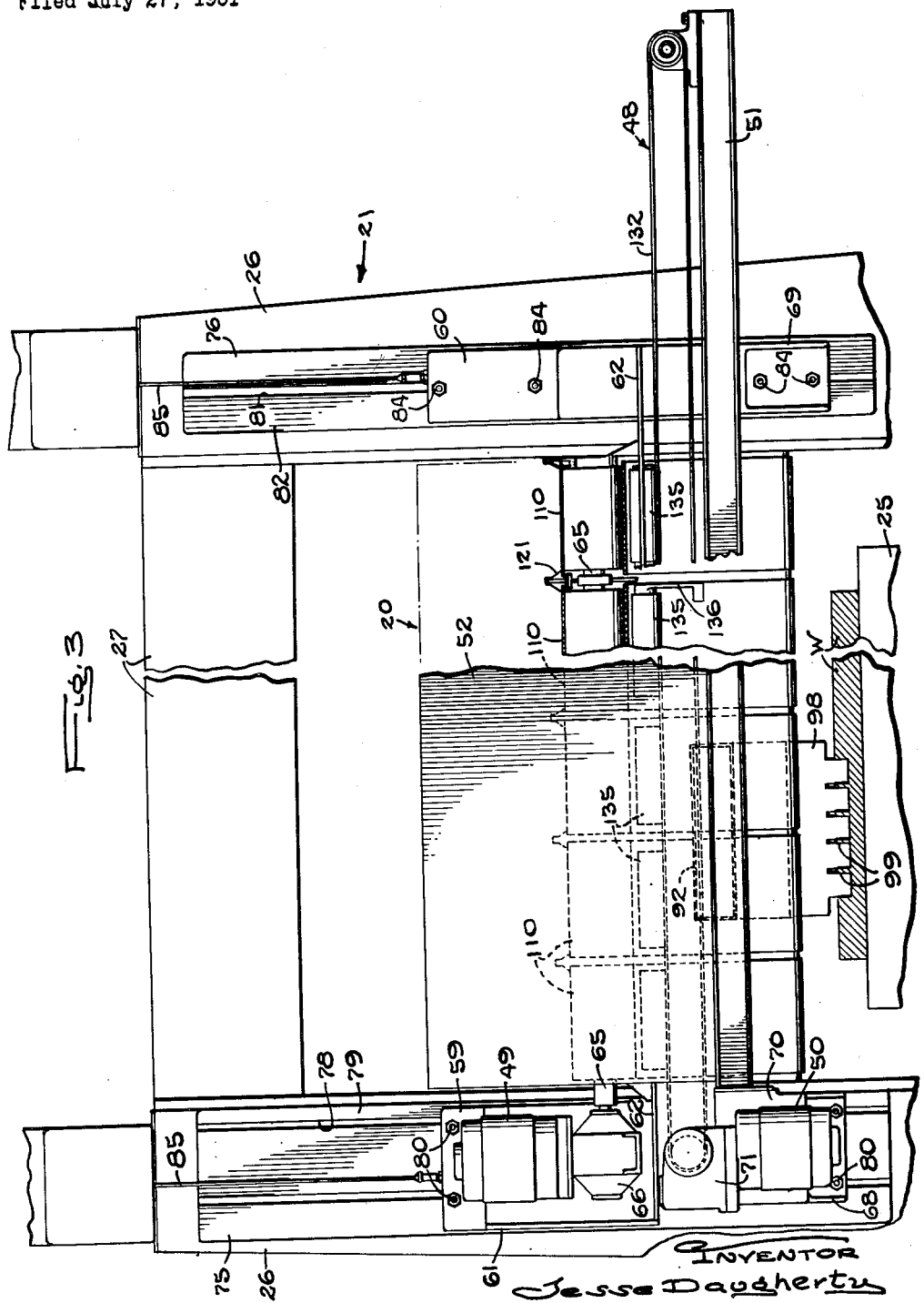
INVENTOR
Jesse Daugherty
Carlson, Pitzner, Hubbard & Wolfe
ATTORNEYS

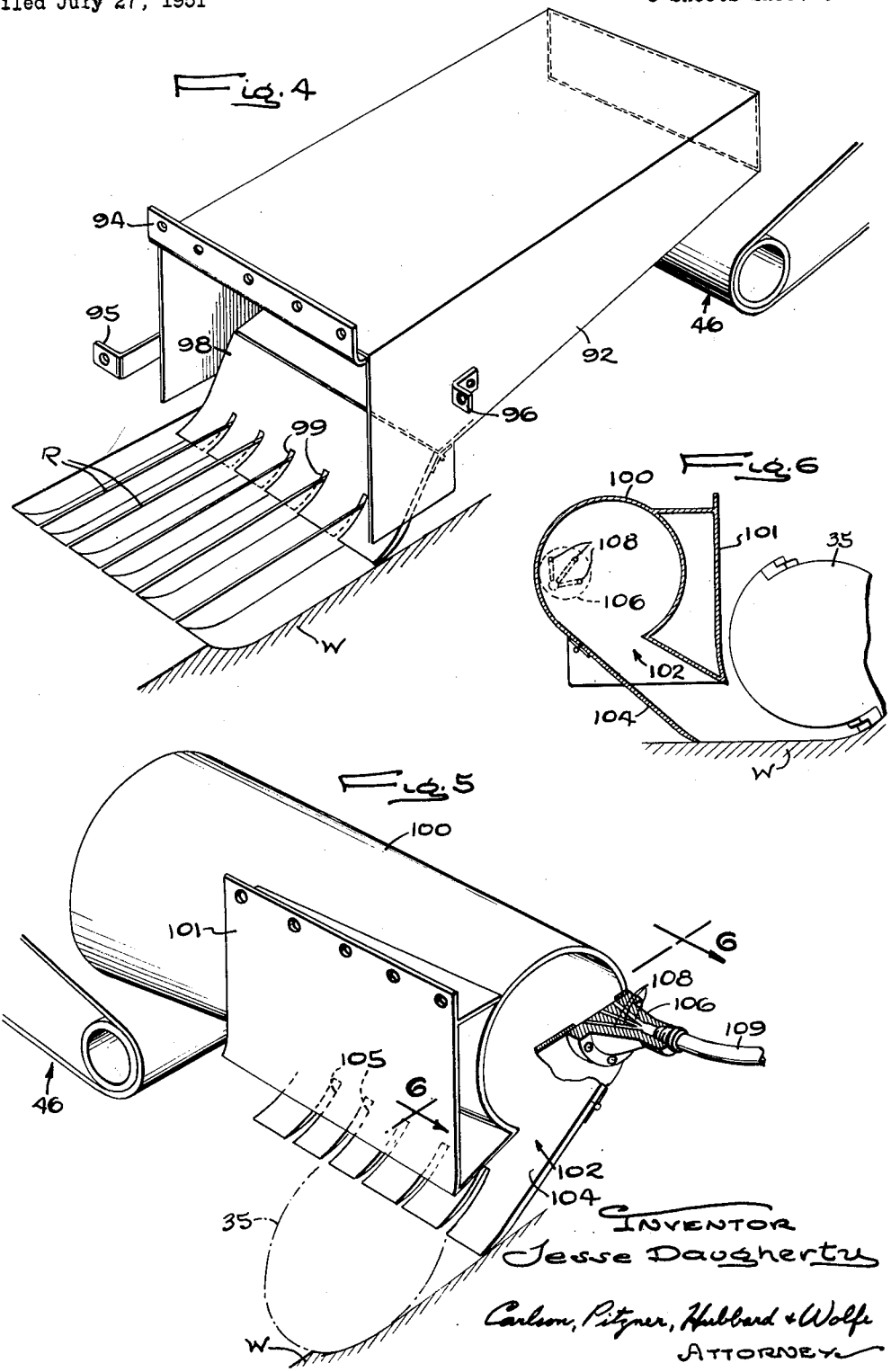

April 19, 1955   J. DAUGHERTY   2,706,432
CHIP CONVEYOR FOR MILLING MACHINE
Filed July 27, 1951   5 Sheets-Sheet 5
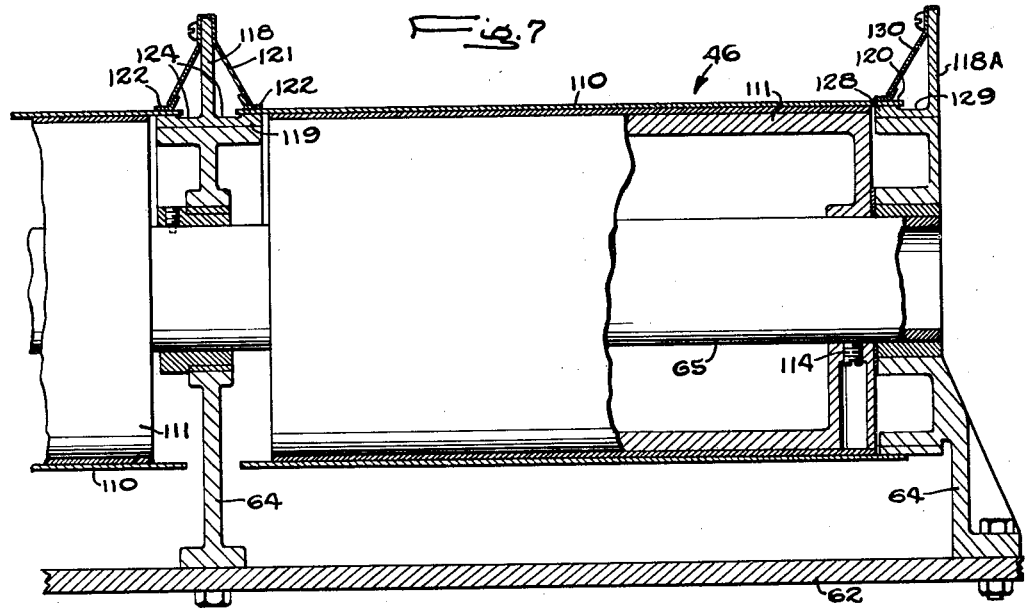
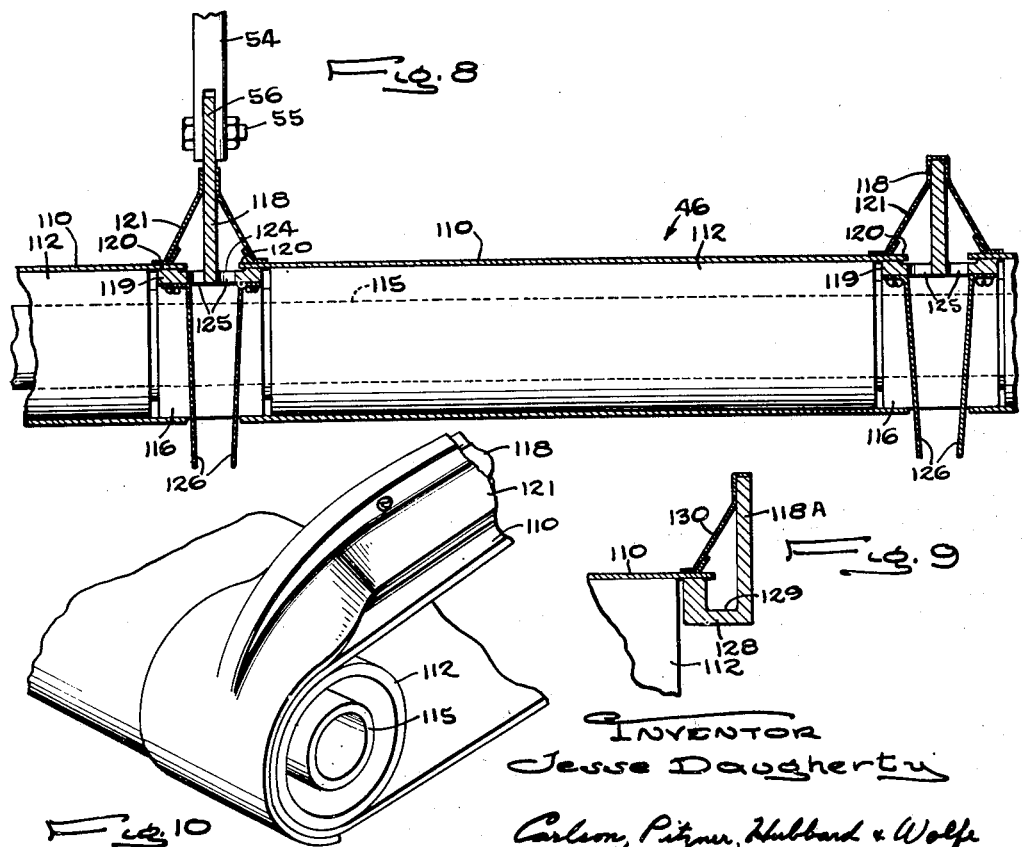

UNITED STATES PATENT OFFICE 2,706,432
Patented Apr. 19, 1955

2,706,432

CHIP CONVEYOR FOR MILLING MACHINE

Jesse Daugherty, Fond du Lac, Wis., assignor to Giddings & Lewis Machine Tool Company, Fond du Lac, Wis., a corporation of Wisconsin Application July 27, 1951, Serial No. 238,901

11 Claims. (Cl. 90—11)

The present invention pertains in general to machine tools and more specifically to a novel arrangement for removing the chips produced by one or more high speed cutting heads on a relatively large milling machine.

The invention finds particular, but not exclusive, utility when applied to a skin miller for cutting integral ribs in plates of aluminum alloy or the like, such as the machine disclosed and claimed in the copending application of Jesse Daugherty and William H. Sorenson, Serial No. 239,158 filed July 28, 1951, and assigned to the assignee of the present invention.

One object of the present invention is to provide conveyor means for collecting and removing the large volume of chips produced at exceptionally rapid rates by one or more high speed milling cutters of a relatively large machine.

Another object is to provide a conveyor of the character set forth and which is adjustable in attitude or inclination relative to the main support of one or more cutter heads but which, in addition, is movable in unison with the main support so as to maintain a constant attitude after initial adjustment.

A further and still more specific object is to provide a conveyor of the type set forth which is particularly well adapted for installation on a planer type miller, the conveyor operating with effectiveness regardless of whether the cutter heads are moving longitudinally relative to the table or traversing the same laterally for cross milling.

Still another object is to provide a conveyor of the above character and having associated therewith means for following the individual contour of the work close to the cutter heads to facilitate collection of chips.

Other objects and advantages will become apparent as the following detailed description proceeds, taken in connection with the accompanying drawings wherein:

Figure 2 is an enlarged fragmentary vertical sectional view taken longitudinally of the bed of the machine of Fig. 1 and showing additional details of the chip conveyor.

Fig. 3 is an enlarged fragmentary rear elevational view of the machine of Fig. 1 and illustrating further details of the chip conveyor.

Fig. 4 is an enlarged perspective view showing one of the chip deflectors which channels the chips to the inclined belt assembly of the conveyor.

Fig. 5 is a perspective view of another form of chip deflector which adapts the conveyor for use in cross milling operations.

Fig. 6 is an enlarged vertical sectional view through the deflector of Fig. 5, such view being taken in the plane of the line 6—6.

Figure 1:
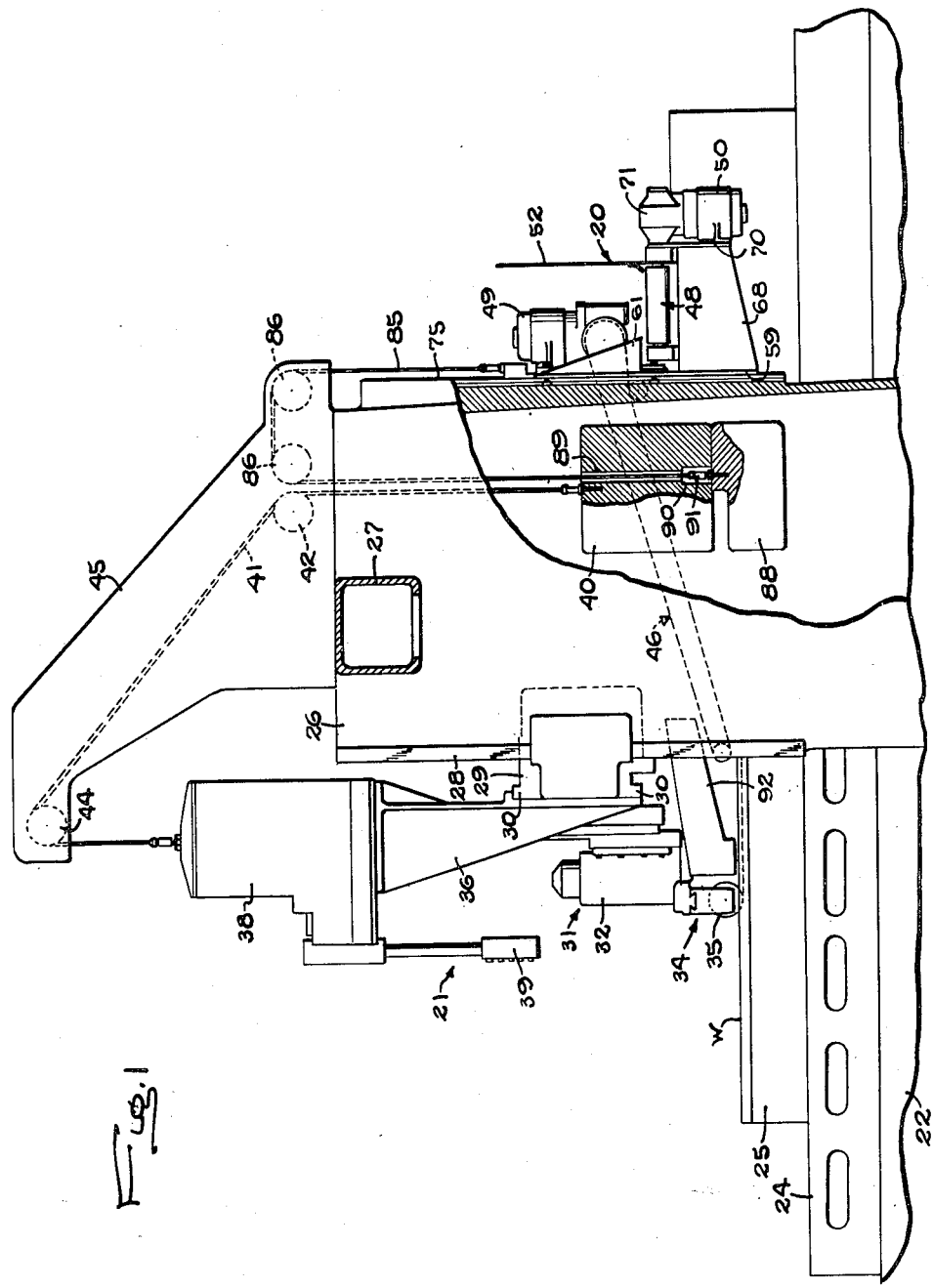
Figure 1 is a side elevational view of an illustrative milling machine equipped with a chip conveyor exemplifying the present invention, certain portions of the machine being broken away for purposes of illustration.

Figs. 7, 8 and 9 are enlarged fragmentary transverse sectional views through the illustrative conveyor, taken respectively in the planes of the lines 7—7, 8—8, and 9—9 in Fig. 2.

Fig. 10 is an enlarged fragmentary perspective view detailing part of the lower end portion of the inclined belt assembly.

While the invention is susceptible of various modifications and alternative constructions, there is shown in the drawings and will herein be described in detail the preferred embodiments, but it is to be understood that it is not thereby intended to limit the invention to the forms disclosed, but it is intended to cover all modifications and alternative constructions falling within the spirit and scope of the invention as expressed in the appended claims.

Referring more specifically to the drawings, the invention is there shown exemplified in an illustrative chip conveyor 20. In the present instance, the conveyor 20 is mounted on a relatively large, high speed planer-type milling machine 21, such as the machine disclosed in the copending application Serial No. 239,158 mentioned earlier herein.

By way of introduction to a description of the conveyor 20, it will be helpful to consider briefly certain general features of the machine 21. As indicated more particularly in Figures 1, 2 and 3, the machine 21 comprises a bed 22 having appropriate horizontal ways (not shown) which slidably support a table 24, the latter being adapted to reciprocate longitudinally of the bed. Mounted on the table 24 for bodily movement therewith is a relatively flat, box-like vacuum fixture 25 which holds a workpiece W for processing by the machine 21. The workpiece W is in the form of a flat slab or plate of metal such as an aluminum alloy of high tensile strength. Straddling the bed 22 and located at the central region thereof are a pair of spaced apart, upstanding columns 26 spanned by a transverse beam or "arch" 27. The front faces of the columns 26 shown on the left in Figures 1 and 2 are provided with vertical ways 28 which are engaged by a hollow, box-like cross rail 29 adapted to be traversed vertically along the ways 28. The front face of the cross rail 29 is provided with horizontally extending guideways 30 which are adapted to carry one or more headstocks 31. Each of the headstocks 31 is equipped with a driving motor 32 which drives a high speed cutter head 34 having a gang of milling cutters 35. The cutter heads 34 carried by one or more of the headstocks are adapted for horizontal adjustment through an angle of about 90°. This permits milling of the workpiece longitudinally of the table as well as cross milling operations transverse to the longitudinal axis of the table. Rigidly fixed to the cross rail 29, as by means of upstanding brackets 36, is a service housing 38 which extends substantially the length of the cross rail and is disposed in overlying relation with the same. The housing 38 contains means for feeding the various services, such as electric power, hydraulic pressure, cooling water, and compressed air, to the headstocks 31 in a manner permitting the same to be traversed along the ways 30 of the cross rail 29. The housing 38 also supports a movable control pendant 39 which can be traversed longitudinally of the cross rail.

The structural assembly comprising the cross rail 29 and the parts attached thereto, such as the headstocks 31 and the service housing 38, are counterweighted by means of weights 40 housed within the columns 26 and connected with the service housing 38 as by cables or other flexible tension elements 41. The latter are trained over sheaves 42, 44 housed within suspension brackets 45 which are rigidly fixed to respective ones of the columns 26. Features of the cross rail and feed reel assembly are more particularly disclosed and claimed in my co-pending application Serial No. 238,295 filed July 24, 1951, and assigned to the assignee of the present invention.

Turning now to the general structural aspects of the conveyor 20, it will be perceived that the same comprises an inclined belt assembly 46, which fits between the upright machine columns 26 in overlying relation with the table 24, and a cross belt assembly 48, which is situated below the upper end of the belt assembly 46 and extends transversely of the columns 26. A motor 49, geared or otherwise connected to the inclined belt assembly 46, drives the same while the cross belt assembly 48 may be driven by a motor 50 connected thereto as by means of suitable gearing. In some instances, however, it will be found desirable to eliminate one of these driving motors and to use a single motor for driving both belt assemblies. The inclined belt assembly 46 has a lateral dimension substantially coextensive with the spacing between the columns 26 and is adapted to collect a procession of chips produced by the cutters 35 of one or more of the cutter heads 34. The chips on the belt assembly 46 are elevated and moved rearwardly, in a direction parallel with the table, being eventually deposited upon the cross belt assembly 48. The latter is mounted on a pair of spaced apart transverse beams 51 and projects laterally from the side of the machine to effect discharge of the chips upon another conveyor or into an underlying receptacle. To insure that all chips thrown off the inclined belt 46 are deposited on the cross belt assembly 48, a baffle 52 is mounted along the edge of the assembly 48 remote from the belt assembly 46.

For the purpose of mounting the conveyor 20 in operative position on the machine 21, advantage is taken of the major structural elements of the machine. Thus the lower end of the inclined belt assembly 46 is supported in depending relation from the cross rail 29 as by means of a plurality of tension rods 54. Each of the rods 54 has its lower end pivotally secured as by means of a pin 55 to an upstanding bracket 56 fixed to the frame of the belt assembly 46. In this instance, each of the rods 54 extends up through the hollow cross rail 29, being anchored thereto as by means of a thrust collar 58 which engages the top surface of the cross rail.

The upper end of the inclined belt assembly 46 and the entire cross belt assembly 48 are suspended from a pair of slides 59, 60 mounted on respective ones of the upright columns 26. Fixed to the slides 59, 60, and braced as by means of gusset plates 61, is a transverse support 62 to which the upper end of the inclined belt assembly 46 is secured (see Figs. 2, 3 and 7). The transverse support 62, preferably in the form of an angle member, carries a plurality of upstanding bearing brackets 64 which have upper roll supporting shaft 65 of the inclined belt assembly journaled therein. The driving motor 49 for the inclined belt assembly 46, together with its gear connection 66 for the shaft 65, is also rigidly mounted upon the slide 59 above the angle member 62 and inside the gusset plate 61.

For the purpose of supporting the cross belt assembly 48 and its underlying I-beams 51, the slide 59 has fixed thereto a cantilever bracket 68 of inverted U-shaped cross section, while the slide 60 is provided with a similar bracket 69. In addition, the bracket 68 on the slide 59 has an end plate 70 which serves as a support for the driving motor 50 of the cross belt assembly 48 and its connecting gearing 71.

For the purpose of accommodating the conveyor 20 to different operating set-ups of the machine 21, the attitude or inclination of the inclined belt assembly 46, as well as the distance of its lower end from the work, may be readily varied. This is accomplished in the present instance by threading the upper end portion of each of the tension rods 54 and by equipping such threaded portion with an adjusting nut 72. The thrust collar 58 is accordingly made with a bore of sufficient diameter to permit sliding of the collar along the rod 54. One or more bearing washers 74 may also be interposed between the nut 72 and the thrust collar 58. Consequently, rotation of the nut 72 associated with each tension rod 54 serves to elevate or depress the lower end of the inclined belt assembly 46, the latter pivoting about its upper end along the axis of the roller shaft 65.

Provision is made for mounting the conveyor 20 on the machine 21 in such a manner that the conveyor will be movable in unison with the vertically movable cross rail structure without disturbing the attitude or inclination adjustment of the inclined belt assembly 46. In furtherance of such objective, the rear edges of the upright columns 26 are fashioned with machined faces 75, 76 (Fig. 3). The face 75 is slotted longitudinally at 78 so as to define vertical guideways 79 along which the slide 59 is adapted to move. The slots 78 are preferably undercut so that the slide 59 can be constrained to move only along the ways 79 as by the use of hold-down bolts 80. By the same token, the machined face 76 on the opposite column is vertically slotted as at 81, defining vertical guideways 82 for the slide 60. The latter is also equipped with hold-down bolts 84 similar to the bolts 80. Upon more particular reference to Figs. 1 and 2, it will be noted that vertical displacement of the cross rail 29 is accompanied by a corresponding vertical displacement of the counterweights 40. Such displacement is equal in magnitude to that of the cross rail 29 but is in the opposite direction. Taking full advantage of such arrangement, each of the conveyor slides 59, 60 has affixed to its upper end a respective one of a pair of flexible tensile elements 85 trained over appropriate guide rollers 86 in the suspension brackets 45 and connected with a corresponding one of a pair of conveyor counterweights 88 underlying the cross rail counterweights 40. Each of the cross rail counterweights 40 has a vertical clearance bore 89 and a counterbore 90 which receive the flexible element 85 and the fastener 91 securing such element to the conveyor counterweight 88. Preferably, the conveyor 20 and its counterweights 88 are so proportioned that the upper end of the conveyor will overbalance the counterweights 88 by a slight margin, causing them to remain in abutment with the undersides of the weights 40 at all times. This slight amount of overbalance is negligible compared to the weight of the inclined end portion of the conveyor 20 and hence causes no interference with the relationship between the counterweights 40 and the cross rail structure 29.

The operation of the structural arrangement just described will no doubt be apparent at this point to those skilled in the art. However, it might be helpful to outline the operation very briefly. Assume first that the cross rail 29 and the structure carried thereby are to be elevated in unison along the ways 28 for a distance of six inches. This displacement of the cross rail 29 along the ways 28 would be simultaneously accompanied by a six inch displacement of the counterweights 40, but in a downward direction. The downward displacement of the weights 40, in turn, effects a like downward displacement of the weights 88. Since the latter are connected by the flexible elements 85 with the slide members 59, 60, it will be appreciated that the weights 88, together with those portions of the conveyor 20 counterbalanced thereby, must be subjected to a six inch upward displacement along the guideways 79, 82. Since the displacements of the opposite ends of the conveyor are identical, there will be no change in attitude of the inclined belt assembly 46. Conversely, a downward displacement of the cross rail structure 29 results in a given upward displacement of the counterweights 40, 88. This, in turn, is accompanied by a corresponding downward displacement of the upper end portion of the belt assembly 46 and the cross belt assembly 48.

In order to facilitate collection of chips and rapid transfer of the same to the inclined belt assembly 46, the conveyor 20 is equipped with an appropriate deflector means adapted to follow the individual contour of the work close to the cutter heads. For cuts running substantially longitudinally of the table 24, each of the cutter heads 34 has mounted thereon a chip deflector 92 which, in this instance, is of open-ended, box-like form. One end of the deflector 92 is attached to one of the cutter heads, as by means of mounting brackets 94, 95, 96, while its opposite end is disposed in overhanging relation with the lower end of the inclined belt assembly 46. As indicated more clearly in Fig. 2, the deflector 92 is of appropriate length to receive a stream of chips from the cutters 35 of its respective cutter head and to channel the chips longitudinally for deposit upon the underlying lower end portion of the inclined belt assembly 46.

For the purpose of following the individual contour of the work W, the deflector 92 is provided with a hinged inclined ramp 98 constituting the initial portion of the floor therein. As indicated in Fig. 4, the ramp 98 is preferably cut so that its lower edge will follow the contour of the work very closely, precluding the passage of chips thereunder. Thus in instances where the workpiece W is being milled out to define a series of upstanding, laterally spaced ribs R, the free end portion of the chip deflector ramp 98 is given a corresponding plurality of spaced slots 99 which receive the workpiece ribs R.

For the purpose of adapting the conveyor 20 for use during cross milling operations of the machine 21, where the cutter heads 34 move transversely relative to the table 24 and the workpiece W, resort is had to a modified form of chip deflector 100 for each of the cutter heads 34 (Figs. 5 and 6). The modified deflector 100 is adapted to receive the stream of chips, which runs laterally of the table during cross milling, and to change the direction of the stream by approximately 90° so that the chips will fall on the inclined belt assembly 46 of the conveyor 20. Accordingly, the deflector 100 is of hollow cylindrical or frusto-conical form and in this instance has a suitable plate-type mounting bracket 101 for attachment to its associated cutter head 34. An aperture 102 in the side wall of the deflector 100 admits the stream of chips thrown up by the cutters 35. Hinged along the lower edge of the aperture 102 is an inclined ramp 104 similar to the ramp 98. The free or lower edge portion of the ramp 104 is also contoured to follow closely the newly milled configuration of the workpiece W and, like the ramp 98, in this case has a series of spaced apart slots 105 which receive the upstanding ribs being defined in the workpiece W by the cutters. By reason of the high speed of the cutters 35, the chips enter the deflector 100 tangentially and tend to accumulate upon the inner peripheral surface thereof. Taking full advantage of this phenomenon, the deflector 100 is equipped with means in the form of an air nozzle 106 for changing the direction of chip flow. (See Fig. 6.) The nozzle 106 is fixed to the end wall of the deflector 100 remote from the inclined belt assembly 46. The nozzle is fashioned with a plurality of divergent air passages 108 fed by an air line 109. The nozzle passages 108, as indicated in Fig. 6, are adapted to direct high velocity streams of air longitudinally of the inner peripheral wall of the deflector 100. These air streams change the direction of movement of the chip accumulations and force them longitudinally of the deflector 100, eventually permitting them to fall upon the inclined belt assembly 46.

Since the procession of chips deposited on the inclined belt assembly 46 will usually include a certain amount of fluid coolant, the conveyor 20 is designed in a manner which avoids leakage of such coolant into the bearings of its moving parts. Due to the probability that minute metallic chips will be present in the coolant, the entry of this material into bearings is highly undesirable. Referring in particular to Figs. 7 to 10, inclusive, it will be noted that the inclined belt assembly 46 actually comprises a plurality of closely spaced, endless flexible belts 110, each trained over an upper or driving roller 111 and a lower or idler roller 112. Each of the driving rollers 111 in this instance is of hollow cylindrical construction, being nested between an adjacent pair of the bearing brackets 64 and fixed to the inclined belt assembly drive shaft 65 as by means of a set screw 114. Each of the idler rollers 112 is somewhat smaller in diameter than its corresponding driving roller, being carried by an idler shaft 115 and nested between an adjacent pair of bearing blocks 116 within which the shaft 115 is journaled. The intermediate bearing brackets 64 and bearing blocks 116 are connected by a plurality of structural elements 118 which happen to be of inverted T-shape. Each of the elements 118 has a pair of laterally extending flanges 119 underlying the overhanging marginal edge portions 120 of the belts 110 and which extend beyond their respective driving and idler rollers. In order to effect a seal between the marginal edge portions 120 of the belts and the elements 118, each of the same may be provided with a longitudinally extending guard 121 of inverted V-shape, the depending edges of the guard 121 being provided with sealing strips 122 of resilient material adapted to bear upon the portions 120 of the belts. To allow for the contingency of a slight amount of leakage past the sealing strips 122 and the belt margins 120, each of the flanges 119 of the elements 118 is formed with a shallow drainage gutter 124 in its upper face. The gutters 124 run longitudinally of the elements 118, terminating adjacent the lower end of the inclined belt assembly where they are provided with drainage apertures 125 which permit return of the coolant to the surface of the work and to the table 24. In order to avoid dripping of coolant from the drainage openings to the lower flights of the belt 110, each pair of openings preferably has a pair of depending baffles 126 mounted adjacent thereto.

Along the lateral edges of the inclined belt assembly, the same is provided with structural elements 118A similar to the elements 118 except for the fact that they are of L-shaped cross section and have only one flange 128 which has a drain gutter 129 of progressively increasing depth. Each of the elements 118A has a guard 130 overlying its drain gutter 119. The guard 130 is similar to the guard 121 except for the fact that it has one leg instead of two.

While the problem of disposing of coolant is not as acute on the cross belt assembly 48 as it is on the inclined belt assembly 46, it is desirable to protect the former against the entry of chips into its bearings. This is accomplished in the present case by means of a pair of chip guards 131 overlying the marginal edge portions of the cross belt 132 (Fig. 2). The guards 131 may be equipped with resilient sealing strips 134 for riding on the belt 132 or, alternatively, may be formed as integral resilient members.

Tension in the belts 110 of the inclined belt assembly 46 may be maintained in any suitable manner. This is accomplished preferably by the use of a plurality of spring loaded rollers 135, one being provided for each of the belts 110. Each of the rollers 135 is journaled in a pair of brackets 136 carried by the transverse structural member 62. The brackets 136 are adjustably mounted relative to the member 62 and may be positioned as by means of one or more adjusting bolts 138.

I claim as my invention:

1. A chip conveyor for use with a planer-type milling machine having a bed, a table reciprocable longitudinally of the bed, a pair of upstanding columns straddling said bed, and at least one cutter head dependably supported by a cross rail spanning said columns at an adjustable height, said chip conveyor comprising the combination of a power driven inclined belt, means for suspending said conveyor from the cross rail and the columns of said machine with said inclined belt disposed at a given attitude at an adjustable height corresponding to that of said at least one cutterhead, a hollow box-like deflector having an inlet aperture and a discharge aperture, said deflector being mountable with its inlet aperture in proximity to the cutter head and its discharge aperture in overlying relation with the lower end of said inclined belt, said deflector being adapted to guide a procession of rapidly moving chips from the cutter head to said inclined belt, and a power driven cross belt mounted in underlying relation with the upper end of said inclined belt for receiving chips discharged therefrom and for discharging the chips laterally of the machine, said cross belt being carried by said conveyor suspending means at an adjustable height corresponding to that of said chip conveyor.

2. A chip conveyor for use with a milling machine having a vertically movable main support for a cutter head and a counterweight attached to the main support, said chip conveyor comprising the combination of an inclined belt assembly, means adjustably suspending the lower end of said inclined belt assembly from the main support of said cutter head, and mechanical connecting means between the upper end of said inclined belt assembly and the counterweight of said main support for maintaining said inclined belt assembly at a constant attitude as said assembly is positioned in unison with the main cutter head support.

3. A chip conveyor for use with a milling machine having a vertically movable main support for a cutter head and a counterweight attached to the main support, said chip conveyor comprising the combination of an inclined belt assembly, means including an adjustable tension member suspending the lower end of said inclined belt assembly from the main support of said cutter head, a cross belt assembly mounted below the upper end of said inclined belt assembly but movable vertically therewith, a conveyor counterweight disposed below the counterweight of said main support, and a flexible tensile element connecting said upper end of said inclined belt assembly and said cross belt assembly with said conveyor counterweight, the latter being slightly lighter than the parts connected thereto so as to remain in abutment with the bottom of said main counterweight in all positions of the same.

4. A chip conveyor for a milling machine having a pair of laterally spaced upstanding columns straddling a bed and a table, the columns supporting a vertically positionable cross rail structure having a pair of main counterweights housed within said columns, said chip conveyor comprising the combination of an inclined belt assembly, longitudinally adjustable tension rods for dependably supporting the lower end portion of said inclined belt assembly from said cross rail structure, a cross belt assembly, means including brackets and structural members connecting the upper end portion of said inclined belt assembly and said cross belt assembly, a pair of conveyor counterweights, one said conveyor counterweight being housed within each said column below the main counterweight therein, and flexible tensile elements interposed between said bracket, and structural member connecting means and respective ones of said conveyor counterweights, the latter being slightly lighter in weight than the means connected thereto so as to remain in abutment with the undersides of the cross rail counterweights in all positions of the latter.

5. A chip conveyor for use with a milling machine having a cutter head, said conveyor comprising, in combination, an inclined belt assembly, a chip deflector in the form of a hollow open-ended enclosure having one end disposed in proximity to the cutter head and its opposite end disposed in overlying relation with said inclined belt assembly, said chip deflector being adapted to channel a stream of chips from the cutter head onto the lower end of said inclined belt assembly, and an inclined ramp hingedly secured to the floor of said chip deflector adjacent said one end thereof, the free end of said ramp being of appropriate contour to seat against the newly milled surface of the work in proximity to the cutter.

6. In a chip conveyor for a milling machine having a cutter head with one or more cutters thereon, the combination comprising an inclined belt assembly, a chip deflector of hollow open-ended and box-like form, said deflector having means for securing one end thereof to the cutter head with its opposite end overlying said inclined belt assembly, and a ramp hinged to the floor of said chip deflector adjacent the cutter head, the free end of said ramp being adapted to rest upon the work, said free end of said ramp also being slotted to conform to the newly milled surface of the work.

7. In a chip conveyor for use with a milling machine having a table and a cutter head susceptible of being traversed laterally of the table for cross milling operations, the combination comprising an inclined belt assembly, means for mounting said inclined belt assembly longitudinally of said table, a chip deflector of substantially circular cross section disposable in proximity to the cutter head for receiving a stream of chips tangentially from one or more cutters thereof, said chip deflector also extending over said inclined belt assembly, and nozzle means for applying an air blast longitudinally of the inner peripheral surface of said chip deflector for changing the direction of movement of the chips therein and depositing the same on said inclined belt assembly.

8. In a chip conveyor for use with a milling machine having a table and a cutter head susceptible of being traversed laterally of the table for cross milling operations, the combination comprising an inclined belt assembly mounted longitudinally of said table, a chip deflector of substantially circular cross section having a closed end and an open end, said chip deflector having an aperture in its side wall adjacent said closed end, a ramp hinged to said chip deflector along one edge of said aperture, means for mounting said chip deflector with its aperture in proximity to the cutter head for receiving a stream of chips tangentially therefrom and with its open end overlying said inclined belt assembly, and divergent nozzle means on said closed end of said chip deflector for changing the direction of movement of the chips therein and depositing the same on said inclined belt assembly.

9. The combination with a planer-type miller having a pair of laterally spaced upstanding columns with vertical guideways on their front and rear surfaces, a cross rail being supported on the guideways of their front surfaces, of a chip conveyor, tension rods for dependably supporting one end of said chip conveyor from the cross rail of said machine, a pair of slides adjustably positionable along the guideways on the rear faces of said columns, a transverse structural member spanning said slides, and means supporting the opposite end of said chip conveyor from said transverse structural member.

10. The combination of a planer-type miller having a pair of laterally spaced upstanding columns supporting a vertically positionable cross rail which is adapted to carry one or more cutter heads, said upstanding columns having vertical guideways on their front and rear surfaces, with a power driven inclined belt assembly, longitudinally adjustable tension rods for dependably supporting the lower end portion of the inclined belt assembly from the cross rail of said machine, a pair of slides adjustably positionable along the guideways on the rear faces of said columns, a transverse structural member spanning said slides, means supporting the upper end of said inclined belt assembly from said transverse structural member, transverse beam members also spanning said slides, a power driven cross belt assembly mounted on said transverse beam members, and brackets supporting said beam members and said cross belt assembly from said slides.

11. The combination of a planer-type milling machine having a pair of laterally spaced upstanding columns straddling a bed and table, the columns supporting a cross rail having at least one cutter head mounted thereon, with an inclined belt first chip conveying assembly disposed between the columns in overlying relation with the table, said inclined belt assembly having a lateral dimension substantially coextensive with the spacing between said columns, and a cross belt second chip conveying assembly disposed transversely of said columns, said cross belt assembly being mounted below the upper end of said inclined belt assembly and having one end overhanging the side of the bed.

References Cited in the file of this patent

UNITED STATES PATENTS

| | | |
|---|---|---|
| 1,216,585 | McCauley | Feb. 20, 1917 |
| 1,840,051 | Nenninger | Jan. 5, 1932 |
| 1,850,891 | Nyborg | Mar. 22, 1932 |
| 1,912,622 | Cone | June 6, 1933 |
| 1,923,781 | Flanders | Aug. 22, 1933 |
| 2,071,619 | Fiegel | Feb. 23, 1937 |
| 2,347,365 | Paradise | Apr. 25, 1944 |
| 2,434,750 | Trecker et al. | Jan. 20, 1948 |

FOREIGN PATENTS

| | | |
|---|---|---|
| 453,024 | Germany | Feb. 27, 1926 |